E. GRAHAM.
WOOD SAWING MACHINE.
APPLICATION FILED JAN. 11, 1911.
994,640.
Patented June 6, 1911.
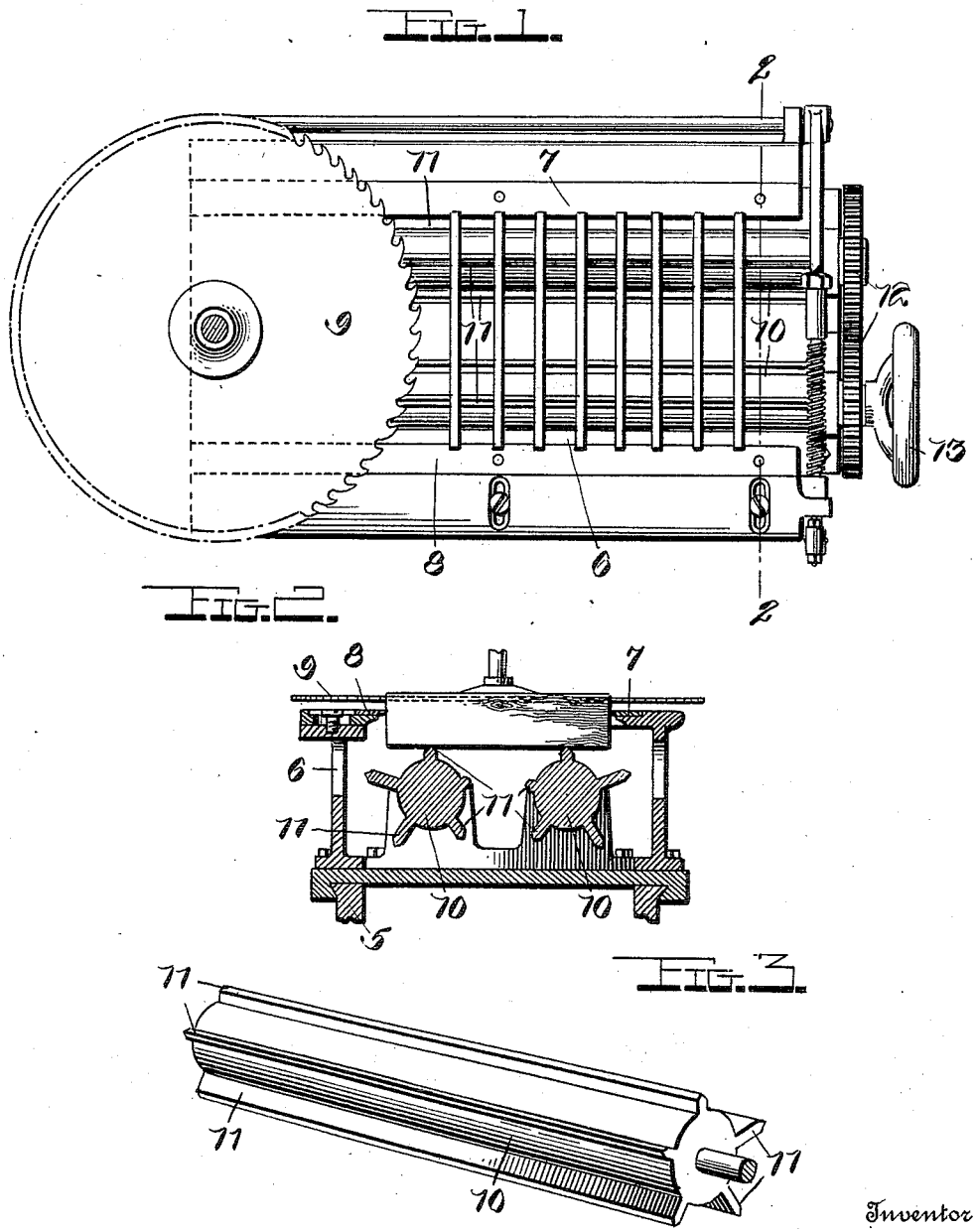
Witnesses
Chas. L. Griestauer.
M. F. Puver
Inventor
Edward Graham.
By Watson E. Coleman.
Attorney

UNITED STATES PATENT OFFICE.

EDWARD GRAHAM, OF LEBANON, TENNESSEE, ASSIGNOR TO GULF RED CEDAR CO., INC., OF LEBANON, TENNESSEE.

WOOD-SAWING MACHINE.

994,640. Specification of Letters Patent. Patented June 6, 1911.

Application filed January 11, 1911. Serial No. 602,053.

*To all whom it may concern:*

Be it known that I, EDWARD GRAHAM, a citizen of the United States, residing at Lebanon, in the county of Wilson and State of Tennessee, have invented certain new and useful Improvements in Wood-Sawing Machines, of which the following is a specification, reference being had to the accompanying drawings.
This invention relates to improvements in wood sawing machines and more particularly to machines of this character commonly known as edging machines, the invention having for its primary object the provision of means whereby the boards or slats may be trimmed or edged without unnecessarily reducing the width of the same.

Another object of the invention is to provide very simple and efficient means whereby the work may be adjusted in the machine and rigidly held in place in the movement of the carrier.

Still another object of the invention is to provide means for edging or trimming a large number of pieces of material at a time, and to eliminate waste of the material.

With the above and other objects in view, the invention consists of the novel features of construction, combination and arrangement of parts hereinafter fully described and claimed, and illustrated in the accompanying drawings, in which—

Figure 1 is a top plan view of a machine for the purpose specified to which my invention is applied; Fig. 2 is a section taken on the line 2—2 of Fig. 1; and Fig. 3 is a detail perspective view of one of the adjusting members.

Referring in detail to the drawing 5 designates the frame of the machine upon which the carrier 6 is mounted. This carrier may be moved by means of any suitable mechanism now well known in the art and the means for securing the work in the carrier may also consist of any approved arrangement of parts whereby the work is rigidly held in position. In the drawing I have illustrated a stationary longitudinal work engaging bar 7 which is formed upon the upper edge of the carrier. A similar bar 8 is mounted upon the opposite side of the carrier and is adjustable thereon. The means for adjusting this latter bar is not illustrated in detail in the drawing but suitable means are employed to move this bar transversely upon the carrier to engage the inner edge thereof with the work after the work has been placed between the opposed edges of the bars 7 and 8. The inner edges of these bars are beveled as clearly shown in Fig. 2 so that they will bite into and rigidly retain the work in position in the movement of the carrier.

A circular saw 9 is mounted upon one end of the machine frame 5 and is rotated in any suitable manner. The carrier in which the work is arranged is adapted to move longitudinally upon the frame beneath this saw, said saw being disposed slightly above the surface of the work holding bars 7 and 8. The work is adapted to be suitably adjusted between the clamping bars of the carrier so as to cut off exactly the proper amount of material and eliminate waste. This means consists of the adjusting members 10 which are similar in all respects and are mounted in suitable bearings arranged upon opposite ends of the carrier. These adjusting members are in the form of cylinders which are arranged between the opposite sides of the carrier and beneath the work clamping bars. A plurality of longitudinally extending ribs 11 are rigidly fixed in each of the cylinders and extend radially therefrom. These ribs as clearly shown in Fig. 2 vary in width upon each of the cylinders. Upon the bearing stud of each of the cylinders at one end thereof, the intermeshing gears 12 are rigidly secured. A hand wheel 13 is also fixed upon one of the cylinder bearing studs by means of which said cylinder is adapted to be rotated. It will be obvious that the other of the cylinders will be rotated in the opposite direction through the engagement of the gears 12. The ribs 11 which are disposed uppermost are always of the same length, said ribs being equally spaced on each of the cylinders and the cylinders rotated at the same speed.

In the operation of my improved attachment, the work which is to be operated upon is arranged between the clamping bars 7 and 8, and the hand wheel is turned to rotate the cylinders and move the ribs thereon into engagement with the under side of the work. As the ribs are of different widths and extend to different distances radially from the surfaces of the cylinders, it will be obvious that the disposition of the work above the plane of the clamping bars 8 may be easily and quickly regulated. When the proper position of the work between the clamping bars has been obtained so that the saw 9 in the movement of the carrier, will cut off only so much as is absolutely necessary to remove the defects, the clamping bar 8 is then moved by the operation of the proper mechanism into engagement with the end of the work so that it is rigidly held in position in the carrier.

In the above manner, the work may be quickly trimmed or edged to remove all defects in the same. It is desirable that the pieces after being trimmed be of great a width as possible. It will be obvious that if desired a greater number of longitudinal ribs 11 than is shown in the drawing may be employed. These ribs extend the entire length of the rollers and bear upon the under side of the work adjacent to the opposite ends thereof. The machine is capable of adjusting a number of pieces simultaneously, or if desired a single piece may also be operated upon.

From the foregoing it is believed that the construction and operation of my improved attachment will be readily understood.

The device is extremely simple, may be easily operated and is comparatively inexpensive in construction.

While I have shown means for operating the rollers manually, it will be understood that suitable connections may be made with the saw operating mechanism whereby these rollers may be mechanically operated if desired.

The device is also susceptible of a great many other minor modifications without departing from the essential feature or sacrificing any of the advantages of the invention.

Having thus described the invention what is claimed is:—

1. The combination with a work support and clamping means carried thereby, a tool mounted above said clamping means, of a pair of rotatable work adjusting members mounted in the work support, means for rotating said members, and means carried by each of said members to simultaneously engage the work to adjust the same with relation to the tool and maintain the work in a plane parallel to the transverse axes of said members.

2. The combination with a movable work support and work holding means carried thereby, a tool mounted above said holding means, of a pair of cylinders rotatably mounted in the work support, means for rotating the cylinders in opposite directions, and means carried by each of the cylinders to simultaneously engage the work and adjust the same with relation to the tool and maintain the work in a plane parallel to the transverse axes of the cylinders.

3. The combination with a movable work support and clamping means carried thereby, a tool mounted above said clamping means, of a pair of cylinders rotatably mounted in the work support, means for rotating said cylinders, and a plurality of longitudinal ribs extending radially from the periphery of each cylinder, the corresponding ribs of said cylinders being adapted to simultaneously engage the work as the cylinders are rotated and adjust the work with relation to the tool to maintain the same in a plane parallel to the transverse axes of the cylinders.

4. The combination with a movable work support and clamping means carried thereby, a tool mounted above said support, of a pair of cylinders rotatably mounted in the support beneath said clamping means, means for rotating said cylinders in opposite directions, and a plurality of longitudinal ribs formed on each of said cylinders, the ribs on each cylinder being of different widths, the corresponding ribs of said cylinders being adapted for simultaneous engagement with the work to adjust the same with relation to the tool and maintain said work in a plane parallel to the transverse axes of the cylinders.

In testimony whereof I hereunto affix my signature in the presence of two witnesses.

EDWARD GRAHAM.

Witnesses:
J. C. SCALE,
JOHN H. MINNFORD.

---

Copies of this patent may be obtained for five cents each, by addressing the "Commissioner of Patents, Washington, D. C."